(12) United States Patent
Kawashima et al.

(10) Patent No.: US 7,030,608 B2
(45) Date of Patent: Apr. 18, 2006

(54) ROTATIONAL ANGLE SENSING DEVICE AND ASSEMBLING METHOD THEREOF

(75) Inventors: Takashi Kawashima, Nagoya (JP); Takashi Hamaoka, Kariya (JP); Takao Ban, Toyohashi (JP)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 11/127,159

(22) Filed: May 12, 2005

(65) Prior Publication Data
US 2005/0253578 A1    Nov. 17, 2005

(30) Foreign Application Priority Data
May 14, 2004    (JP)    .............................. 2004-145028

(51) Int. Cl.
*G01B 7/30*    (2006.01)

(52) U.S. Cl. ................................................ 324/207.25

(58) Field of Classification Search ..................... None
See application file for complete search history.

(56) References Cited

U.S. PATENT DOCUMENTS

| | | | | |
|---|---|---|---|---|
| 6,940,275 | B1* | 9/2005 | Sogge | ..................... 324/207.2 |
| 2004/0160220 | A1* | 8/2004 | Wendt | .................... 324/207.21 |
| 2004/0164733 | A1* | 8/2004 | Fukaya et al. | ......... 324/207.25 |
| 2004/0217758 | A1* | 11/2004 | Leonard | ................... 324/207.2 |

FOREIGN PATENT DOCUMENTS

| | | |
|---|---|---|
| JP | 62-95402 | 5/1987 |
| JP | 2003-75108 | 3/2003 |

* cited by examiner

*Primary Examiner*—Bot Ledynh
(74) *Attorney, Agent, or Firm*—Nixon & Vanderhye P.C.

(57) ABSTRACT

A magnet is provided to one of two members, which make relative rotation therebetween. First and second Hall elements are arranged adjacent to each other and are provided to the other one of the two members. A magnetic sensing surface of the first Hall element is generally perpendicular to a magnetic sensing surface of the second Hall element, and a relative rotational angle between the two members is determined through the first and second Hall elements based on a magnetic flux, which is generated by a magnetic flux generating portion of the magnet and passes through the first and second Hall elements toward a magnetic flux attracting portion of the magnet.

10 Claims, 8 Drawing Sheets

ROTATIONAL ANGLE SENSING DEVICE AND ASSEMBLING METHOD THEREOF

CROSS REFERENCE TO RELATED APPLICATION

This application is based on and incorporates herein by reference Japanese Patent Application No. 2004-145028 filed on May 14, 2004.

BACKGROUND OF THE INVENTION

1. Field of the Invention

The present invention relates to a rotational angle sensing device, which measures a relative rotational angle between two members (e.g., a rotatable member and a non-rotatable member) without making any physical contact. The present invention further relates to an assembling method of such a rotational angle sensing device.

2. Description of Related Art

FIGS. 10A and 10B show a prior art rotational angle sensing device, which measures a wide range of rotational angles through use of a magnet and magnetic sensing elements (see for example, Japanese Unexamined Patent Publication No. 2003-75108).

The rotational angle sensing device includes a circular disk shaped magnet 2 and first and second Hall ICs 3, 4. An outer peripheral circular edge of the magnet 2 is substantially coaxial with a rotatable shaft 1. The magnet 2 has a magnetic flux generating portion (N pole) and a magnetic flux attracting portion (S pole), which are diametrically opposed to each other in a plane perpendicular to the rotatable shaft 1. In FIG. 10B, the first and second Hall ICs 3, 4 are arranged below the outer peripheral edge of the magnet 2 in such a manner that the second Hall IC 4 is displaced from the first Hall IC 3 by 90 degrees in a rotational direction of the magnet 2. The first and second Hall ICs 3, 4 output signals, which correspond to the magnetic flux outputted from the magnet 2.

When the magnet 2 is rotated, the first and second Hall ICs 3, 4 generate a sine wave output signal and a cosine wave output signal, respectively, like ones shown in FIG. 5A. An angle computing circuit (a microcomputer) converts the sine wave signal and the cosine wave signal through use of an inverse trigonometric function into a characteristic saw tooth waveform, which is similar to one shown in FIG. 5B and is periodically repeated at 180 degree intervals. The characteristic saw tooth waveforms are connected one after another to obtain a rotational angle output ranging from 0 degree to 360 degrees, like one shown in FIG. 5C.

In the above prior art rotational angle sensing device, the first Hall IC 3 and the second Hall IC 4 are arranged separately from one another. Therefore, a space for accommodating the first Hall IC 3 and a space for accommodating the second Hall IC 4 are respectively required. Therefore, in a case where the available accommodating space is relatively small, it is difficult to provide the accommodating spaces for accommodating the first and second Hall ICs 3, 4. Thus, in such a case, when the prior art rotational angle sensing device is used, the first Hall IC 3 and the second Hall IC 4 cannot be spaced from one another, and therefore the rotational angle cannot be measured. Furthermore, in the prior art rotational angle sensing device, since the first Hall IC 3 and the second Hall IC 4 are spaced from one another, a difference in the environmental condition (e.g., temperature) may exist between the first Hall IC 3 and the second Hall IC 4 to cause a substantial difference in the output between the first Hall IC 3 and the second Hall IC 4, resulting in deterioration of the accuracy of the measured angle.

SUMMARY OF THE INVENTION

The present invention addresses the above disadvantage. Thus, it is an objective of the present invention to provide a rotational angle sensing device, which has improved arrangement of two magnetic sensing elements and measures a rotational angle in a range of 0 to 360 degrees. It is a further objective of the present invention to provide a method for assembling such a rotational angle sensing device.

To achieve the objectives of the present invention, there is provided a rotational angle sensing device for measuring a relative rotational angle between two members, which make relative rotation therebetween. The rotational angle sensing device includes a magnet and first and second magnetic sensing elements. The magnet is provided to one of the two members and is configured into one of a ring shape and a circular disk shape. A center of an outer peripheral edge circle, which is defined by an outer peripheral edge of the magnet, substantially coincides with a rotational axis of the relative rotation. The magnet includes a magnetic flux generating portion and a magnetic flux attracting portion, which are diametrically opposed to each other. The first and second magnetic sensing elements are arranged adjacent to each other and are provided to the other one of the two members. A magnetic sensing surface of the first magnetic sensing element is generally perpendicular to a magnetic sensing surface of the second magnetic sensing element. The relative rotational angle between the two members is determined through the first and second magnetic sensing elements based on a magnetic flux, which is generated by the magnetic flux generating portion and passes through the first and second magnetic sensing elements toward the magnetic flux attracting portion.

To achieve the objectives of the present invention, there is also provided a method for assembling a rotational angle sensing device. According to the method, two coaxial magnets are installed. Each of the two magnets is configured into one of a ring shape and a circular disk shape and has a magnetic flux generating portion and a magnetic flux attracting portion that are diametrically opposed to each other. The magnetic flux generating portion and the magnetic flux attracting portion of one of the two magnets are axially aligned with the magnetic flux attracting portion and the magnetic flux generating portion, respectively, of the other one of the two coaxial magnets. Then, first and second magnetic sensing elements are installed to a predetermined location where magnetic fluxes of the two magnets are substantially cancelled with each other, so that a remaining magnetic flux in the predetermined location becomes substantially zero, wherein the first and second magnetic sensing elements are arranged adjacent to each other and have magnetic sensing surfaces, respectively, which are generally perpendicular to each other. Then, the one of the two coaxial magnets is re-installed in such a manner that the magnetic flux generating portion and the magnetic flux attracting portion of the one of the two coaxial magnets are axially aligned with the magnetic flux generation portion and the magnetic flux attracting portion, respectively, of the other one of the two coaxial magnets.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to FIGS. 1 to 6.

Figure 1A:
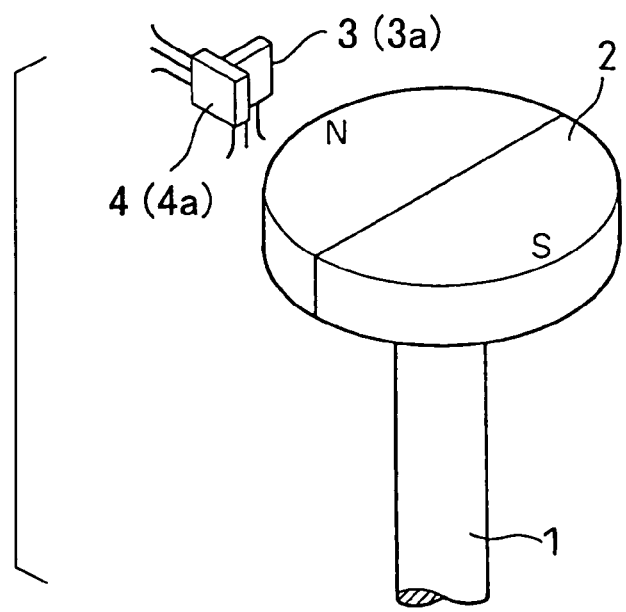
FIG. 1A is a schematic perspective view of a rotational angle sensing device according to a first embodiment of the present invention.
Figure 1B:
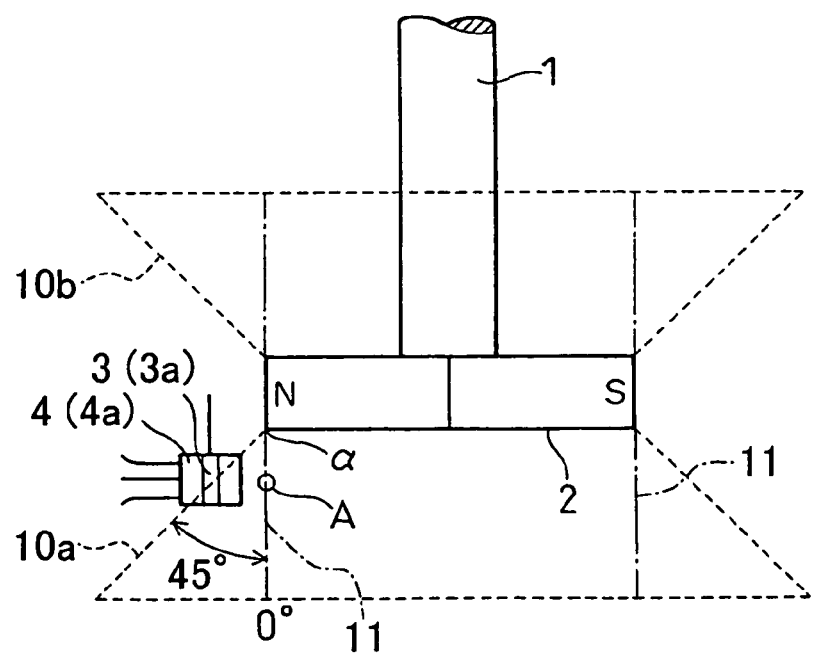
FIG. 1B is a schematic inverted side view of the rotational angle sensing device of FIG. 1A.
Figure 2:
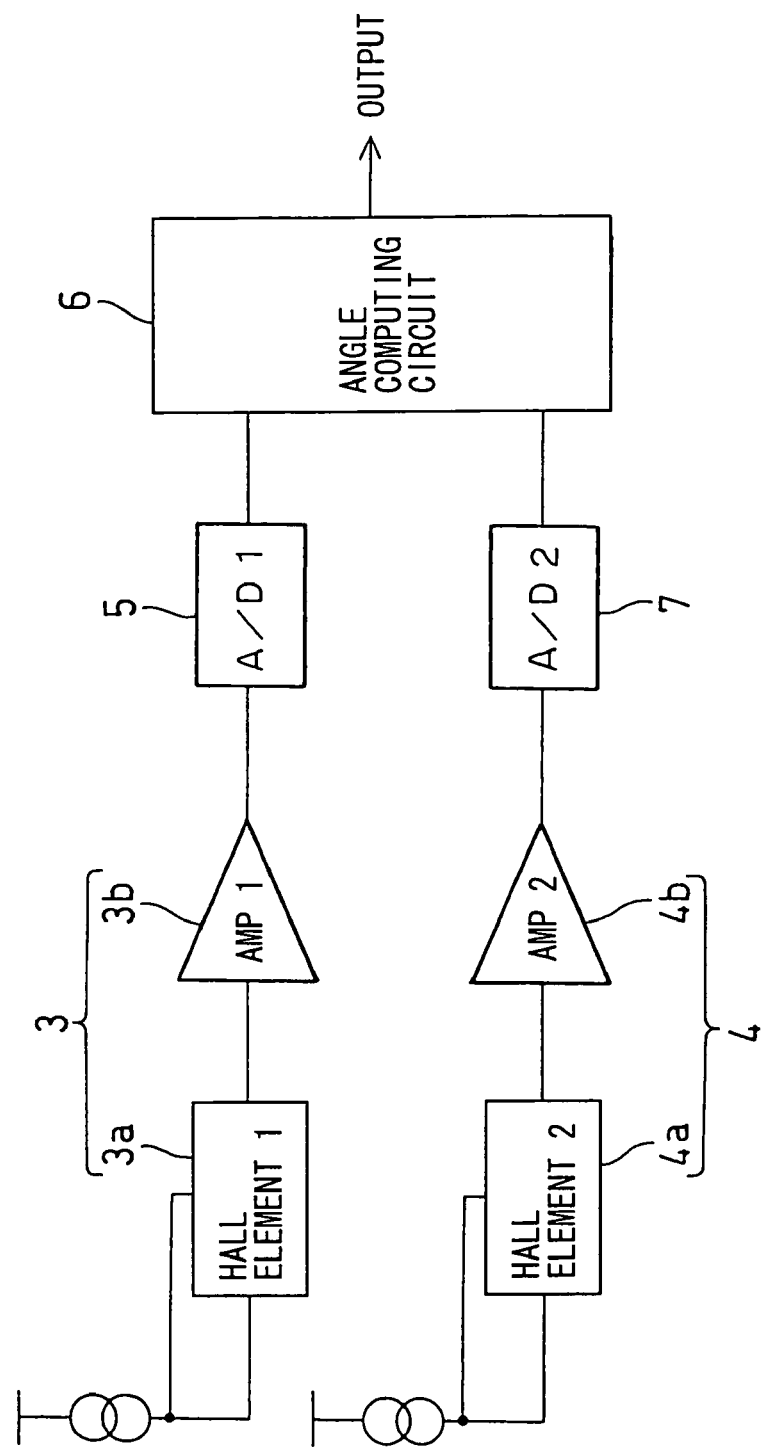
FIG. 2 is a schematic diagram showing an electric circuit of the rotational angle sensing device of the first embodiment.

First, a basic structure of a rotational angle sensing device according to the first embodiment will be described with reference to FIGS. 1A to 2. FIG. 1A is a schematic perspective view of the rotational angle sensing device, and FIG. 1B is a schematic inverted side view of the rotational angle sensing device. FIG. 2 is a schematic circuit diagram of the rotational angle sensing device.

The rotational angle sensing device of the present embodiment measures a rotational angle of a rotatable shaft 1 of, for example, a throttle valve (e.g., a degree of opening of the throttle valve). The rotational angle sensing device includes a magnet 2 and first and second Hall ICs 3, 4. The magnet 2 is secured to thr rotatable shaft 1 (a rotatable member, which is one of two members that make relative rotation therebetween). The first and second Hall ICs 3, 4 are mounted to an undepicted fixed member (the other one of the members that make the relative rotation therebetween), such as a circuit board secured to a housing. The relative rotational angle between the rotatable shaft 1 and the fixed member is measured based on a change in a magnetic flux of the magnet 2, which is applied to the first and second Hall elements 3a, 4a of the first and second Hall ICs 3, 4.

The magnet 2 has a uniform thickness in the axial direction of the rotatable shaft 1 and is configured into one of a ring shape and a circular disk shape. A center of an outer peripheral edge circle, which is defined by an outer peripheral edge of the magnet 2, substantially coincides with a rotational axis of the rotatable shaft 1 (the rotational axis of the relative rotation). A magnetic flux generating portion (N pole) and a magnetic flux attracting portion (S pole) of the magnet 2 are diametrically opposed to one another in a plane perpendicular to the rotatable shaft 1.

The magnet 2 of this embodiment is magnetized in such a manner that a magnetizing direction of the magnetic flux generating portion and a magnetizing direction of the magnetic flux attracting portion are displaced from one another by 180 degrees in the plane perpendicular to the rotatable shaft 1.

The first Hall IC 3 has a known structure, in which a first Hall element 3a (a first magnetic sensing element) and a first amplifier 3b are encapsulated in a single chip. The first Hall element 3a generates an output, which corresponds to a flow direction and a flux density of a magnetic flux, which passes through a magnetic sensing surface of the first Hall element 3a. The first amplifier 3b amplifies the weak output of the first Hall element 3a.

The second Hall IC 4 has a known structure, in which a second Hall element 4a (a second magnetic sensing element) and a second amplifier 4b are encapsulated in a single chip. The second Hall element 4a generates an output, which corresponds to the flow direction and the flux density of the magnetic flux, which passes through a magnetic sensing surface of the second Hall element 4a. The second amplifier 4b amplifies the weak output of the second Hall element 4a.

The first and second Hall ICs 3, 4 are arranged adjacent to one another. The planar magnetic sensing surface of the first Hall element 3a, which is parallel to a plane of the first Hall IC 3 in this embodiment, is generally arranged parallel to a tangent line or a tangent plane, which is tangent to the outer peripheral circular edge of the magnet 2 and is parallel to the rotational axis. The planar magnetic sensing surface of the second Hall element 4a, which is parallel to a plane of the second Hall IC 4 in this embodiment, is generally arranged perpendicular to the tangent line or the tangent plane, which is tangent to the outer peripheral circular edge of the magnet 2. With this construction, the magnetic sensing surface of the second Hall element 4a is generally perpendicular to the magnetic sensing surface of the first Hall element 3a.

As a result, a phase of the measurement output of the second Hall IC 4 is displaced 90 degrees from the measurement output of the first Hall IC 3. Therefore, upon rotation of the magnet 2, the first Hall IC 3 generates a sine wave measurement output, which makes one cycle of 360 degrees, and the second Hall IC 4 generates a cosine wave measurement output, which makes one cycle of 360 degrees.

With reference to FIG. 1B, the first and second Hall elements 3a, 4a are placed to cross an imaginary conical surface 10a (or 10b) of a corresponding imaginary frustum, a cross section of which is indicated by a dotted line in FIG. 1B. The imaginary conical surface 10a (or 10b) extends out of the magnet 2 from an outer peripheral edge α of one axial end surface of the magnet 2 at 45 degrees with respect to an imaginary cylindrical surface 11, which axially extends through the outer peripheral edge α of the magnet 2 and is coaxial with the rotational axis (or with respect to an imaginary line, i.e., a left dot-dash line in FIG. 1B that axially extends through the outer peripheral edge α of the magnet 2 to define a direction of a zero degree angle and is coaxial with the rotational axis). Here, it is preferred that the conical surface 10a extends generally through the center of each of the first and second Hall elements 3a, 4a. Furthermore, in FIG. 1B, although the first and second Hall elements 3a, 4a are placed to cross the imaginary conical surface 10a, the first and second Hall elements 3a, 4a may be alternatively placed to cross the other imaginary conical surface 10b in FIG. 1B.

When the first and second Hall elements 3a, 4a are arranged on the conical surface 10a, the wave heights (or amplitudes) of the measurement output waves of the first and second Hall ICs 3, 4 can be easily made uniform, i.e., can be easily coincided with each other.

When the diameter of the magnet 2 is changed, the flow angle of the magnetic flux, which flows outwardly from the magnet 2, changes. Thus, in such a case, the passing angle of the magnetic flux, which passes the first and second Hall elements 3a, 4a, changes.

Furthermore, when the distance between the magnet 2 and the first and second Hall elements 3a, 4a changes, the passing angle of the magnetic flux, which passes the first and second Hall elements 3a, 4a, changes.

Figure 3:
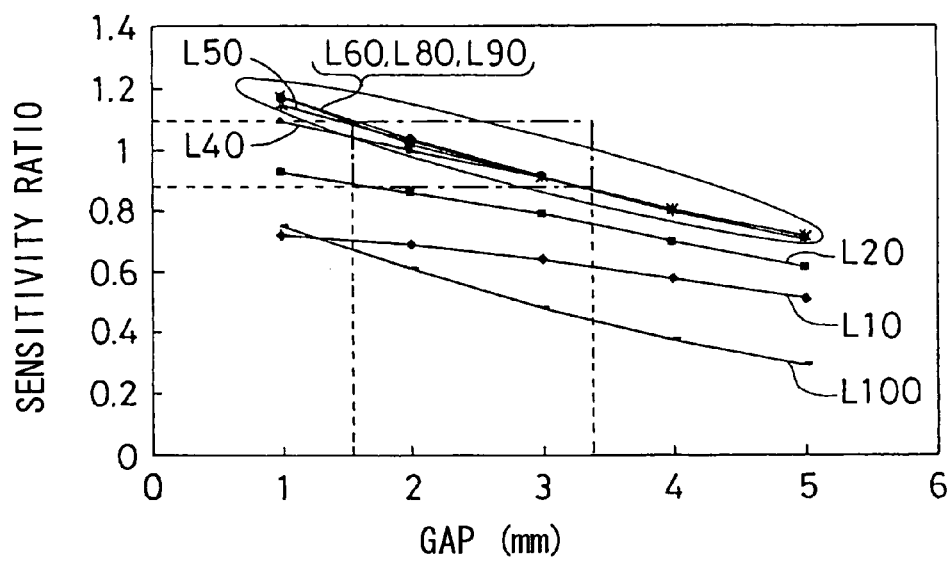
FIG. 3 is a graph showing a relationship between a gap between a magnet and first and second Hall elements of first and second Hall ICs and a sensitivity ratio of the first and second Hall ICs of the rotational angle sensing device of the first embodiment.

FIG. 3 shows a sensitivity ratio of the first and second Hall ICs 3, 4 (i.e., an amplitude ratio between the amplitude of the sine wave measurement output of the first Hall IC 3 and the amplitude of the cosine wave measurement output of the second Hall IC 4) with respect to a gap between the magnet 2 and the first and second Hall elements 3a, 4a of the Hall ICs 3, 4 (i.e., the radial distance measured from the above-described outer peripheral edge α of the magnet 2) for various types of magnets 2, which have the same axial thickness of 6 mm but different outer diameters.

In FIG. 3, the lines L10, L20, L40, L50, L60, L80, L90 and L100 indicate the measured results of the magnets having the outer diameters 10 mm, 20 mm, 40 mm, 50 mm, 60 mm, 80 mm, 90 mm and 100 mm, respectively, for showing the relationship between the gap and the sensitivity ratio.

Figure 4:
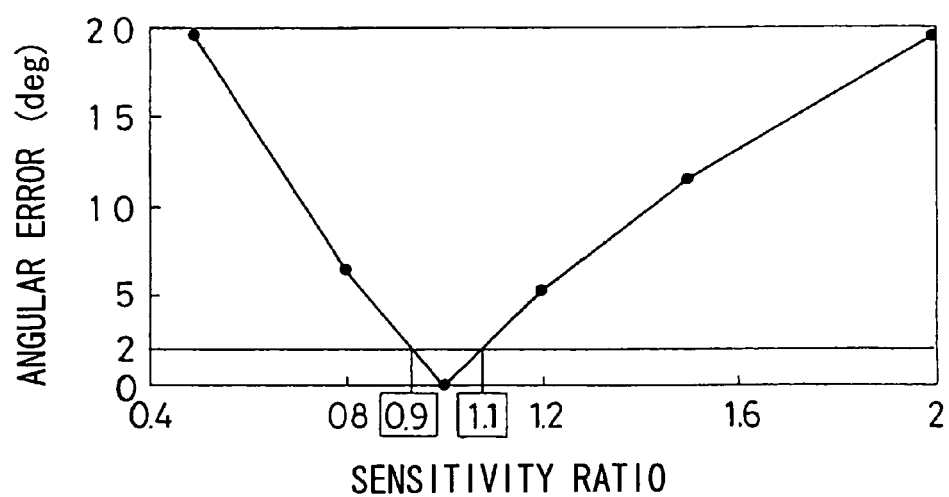
FIG. 4 is a graph showing a relationship between the sensitivity ratio of the first and second Hall ICs and a angular error according to the first embodiment.

The sensitivity ratio may cause a measurement error in the measured angle, so that it is preferred to make the sensitivity ratio equal to or close to 1. Here, as shown in FIG. 4, the sensitivity ratio should be limited in a range of 1±0.1 (i.e., 0.9 to 1.1) to limit the measurement angular error to be less than 2 degrees.

As shown in FIG. 3, this condition is satisfied when the outer diameter of the magnet 2 is in a range of 50 mm to 90 mm, and the first and second Hall elements 3a, 4a are positioned in a range of 1.5 mm to 3.5 mm from the outer peripheral edge α of the magnet in the radially outward direction.

Figure 5A:
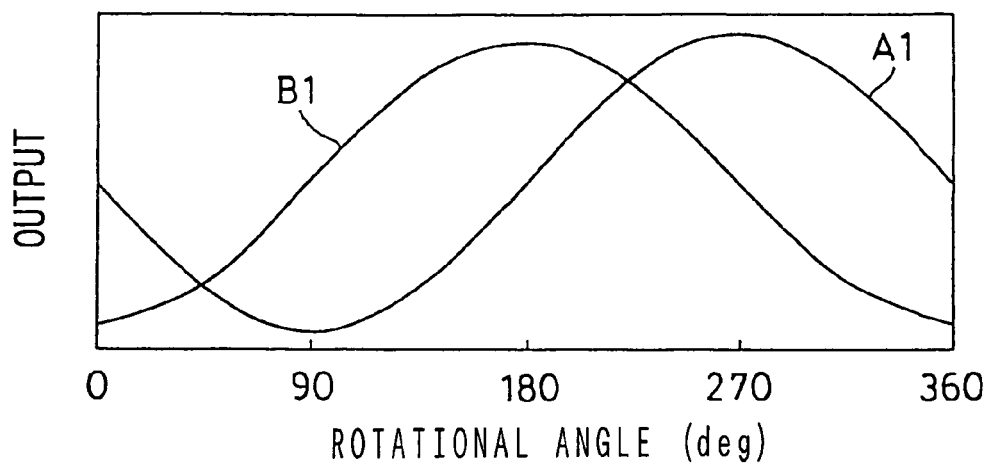
FIG. 5A is a graph showing a relationship between a rotational angle and an output according to the first embodiment.

The rotational angle sensing device is arranged in the above described manner. Thus, as shown in FIG. 5A, the first Hall IC 3 generates the sine wave measurement output (the line A1 in FIG. 5A) relative to the rotation of the magnet 2, and the second Hall IC 4 generates the cosine wave measurement output (the line B1 in FIG. 5A) relative to the rotation of the magnet 2. Furthermore, the wave height of the sine wave measurement output of the first Hall IC 3 and the wave height of the cosine wave measurement output of the second Hall IC 4 are generally the same.

In the rotational angle sensing device, as shown in FIG. 2, the output of the first Hall IC 3 is converted by a first analog-to-digital converter (ADC) 5 and is inputted to an angle computing circuit (microcomputer) 6. Furthermore, the output of the second Hall IC 4 is converted by a second ADC 7 and is inputted to the angle computing circuit 6.

Figure 5B:
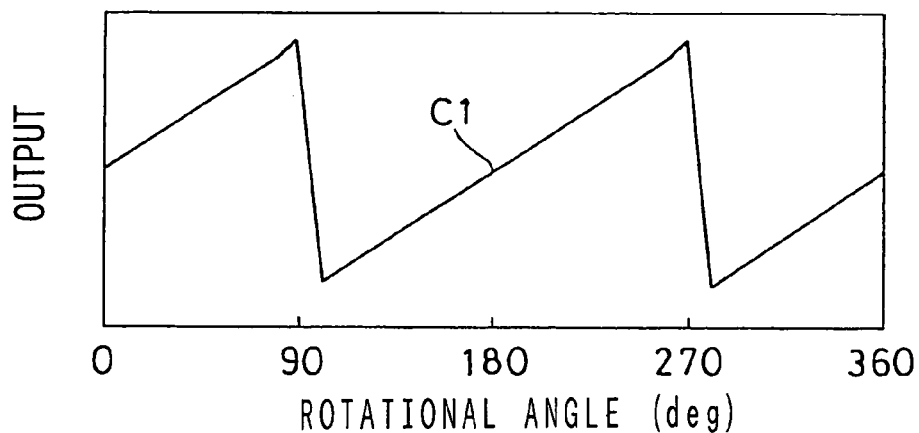
FIG. 5B is a graph showing a relationship between a rotational angle and an output upon conversion through use of an inverse trigonometric function according to the first embodiment.

The angle computing circuit 6 is for computing the corresponding angle based on the outputs of the first and second Hall ICs 3, 4. As shown in FIG. 5B, the angle computing circuit 6 converts the sine wave measurement output of the first Hall IC 3 and the cosine wave measurement output of the second Hall IC 4 shown in FIG. 5A into a characteristic saw tooth waveform C1, which is repeated at 180 degree intervals, through use of the inverse trigonometric function:

$$\{\tan \theta = \sin \theta/\cos \theta \rightarrow \theta = \tan^{-1}(\sin \theta/\cos \theta)\}.$$

Figure 5C:
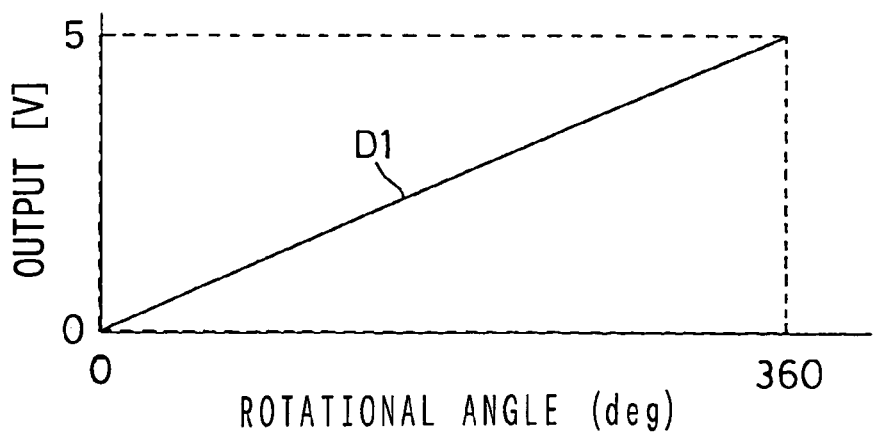
FIG. 5C is a graph showing a measured rotational angle and an output of the magnetic sensing device according to the first embodiment.

Then, as shown in FIG. 5C, the angle computing circuit 6 joins the characteristic saw tooth waveforms C1 to generate a rotational angle output D1 (analog signal), which corresponds to the rotational angle of the magnet 2 ranging from 0 to 360 degrees.

Figure 6A:
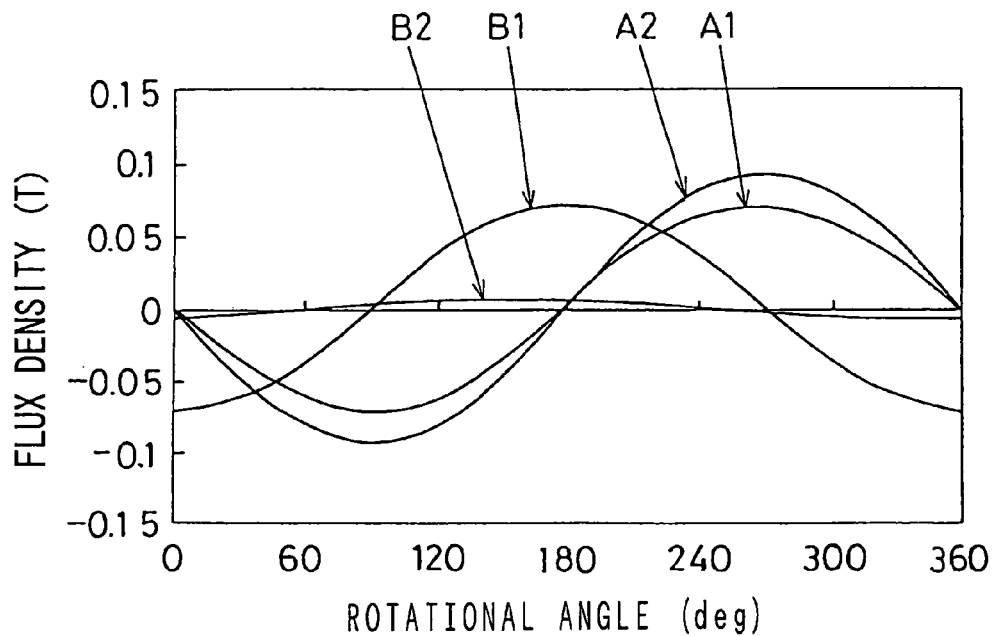
FIG. 6A is a graph showing a relationship between a rotational angle and a magnetic flux density in a comparative exemplary case along with the relationship between the rotational angle and the flux density according to the first embodiment.

When the first and second Hall elements 3a, 4a are arranged on the imaginary cylindrical surface 11 (e.g., the point A of FIG. 1B), the change in the magnetic flux, which passes through the second Hall element 4a, becomes substantially zero. Thus, as shown in FIG. 6A, the wave height (B2 in FIG. 6A) of the waveform of the measurement output of the second Hall IC 4 becomes small relative to the wave height (A2) of the waveform of the measurement output of the first Hall IC 3.

Figure 6B:
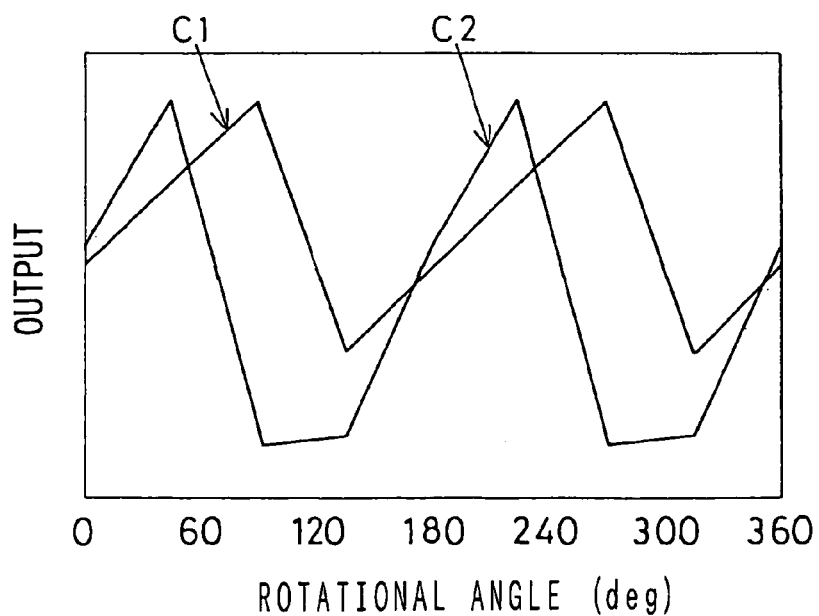
FIG. 6B is a graph showing a relationship between a rotational angle and an output upon conversion through use of an inverse trigonometric function in the comparative exemplary case and in the first embodiment.

Furthermore, when these outputs B2, A2 are converted through the inverse trigonometric function, the resultant characteristic line C2 does not form the above-described saw tooth waveform, which is repeated at 180 degree intervals, as shown in FIG. 6B.

Next, the advantage of the first embodiment will be described.

In the rotational angle sensing device of the first embodiment, the first and second Hall elements 3a, 4a are arranged adjacent to one another, and the magnetic sensing surface of the second Hall element 4a is generally perpendicular to the magnetic sensing surface of the first Hall element 3a. Thus, there is only one required accommodating space for accommodating the first and second Hall ICs 3, 4. In this way, a degree of freedom in terms of the mountability of the first and second Hall ICs 3, 4 is improved, and therefore the mountability of the first and second Hall ICs 3, 4 in the rotational angle sensing device can be improved. Furthermore, since the first and second Hall ICs 3, 4 are arranged adjacent to one another, the environmental condition of the first Hall element 3a and the environmental condition of the second Hall element 4a are substantially the same. Thus, the deviation of the output of the first Hall element 3a and the deviation of the output of the second Hall element 4a become substantially the same, and therefore the good and stable angle measurement accuracy can be achieved.

Furthermore, the first and second Hall elements 3a, 4a are arranged away from the magnet 2 at the predetermined position on the imaginary conical surface 10a, which extends at 45 degrees from the outer peripheral edge α of the magnet 2, and therefore the wave heights of the measurement output waves of the first and second Hall ICs 3, 4 can be easily made uniform.

Furthermore, the outer diameter of the magnet 2 is held within the range of 50 mm to 90 mm, and the first and second Hall elements 3a, 4a are placed in the range of 1.5 mm to 3.5 mm away from the outer peripheral edge α of the magnet 2 at the radially outward of the outer peripheral edge α. Thus, the wave height of the first Hall IC 3 and the wave height of the second Hall IC 4 substantially coincide with one another. In this way, the sensitivity ratio of the first and second Hall ICs 3, 4 is limited in the range of 0.9 to 1.1, and thereby the angular measurement error of the rotational angle sensing device can be limited within 2 degrees.

Second Embodiment

Figure 7:
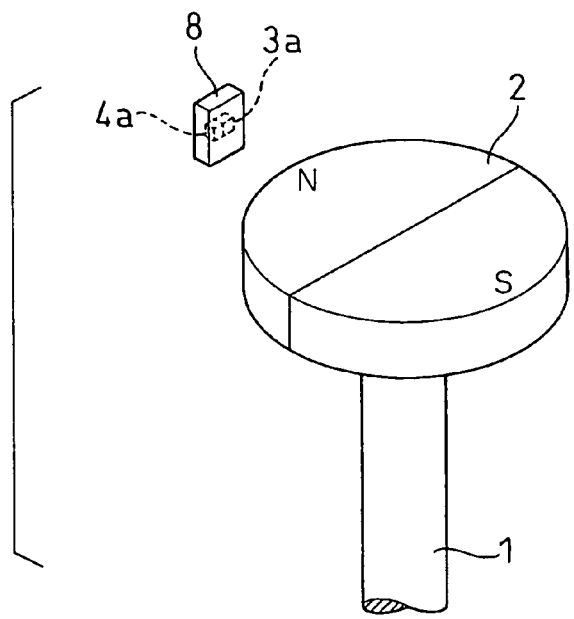
FIG. 7 is a schematic perspective view showing a rotational angle sensing device according to a second embodiment.

A second embodiment of the present invention will be described with reference to FIG. 7.

In the first embodiment, the first Hall IC 3, which includes the first Hall element 3a, is arranged adjacent the second Hall IC 4, which includes the second Hall element 4a.

In the second embodiment, the first Hall element 3a and the second Hall element 4a are arranged in a single chip 8. The first and second Hall elements 3a, 4a, which are encapsulated in the single chip 8, are arranged in a manner similar to that of the first embodiment. Thus, the magnetic sensing surface of the first Hall element 3a is parallel to the tangent line or the tangent plane, which is tangent to the outer peripheral circular edge of the magnet 2, and the magnetic sensing surface of the second Hall element 4a is perpendicular to the tangent line or the tangent plane, which is tangent to the outer peripheral circular edge of the magnet 2. Therefore, the magnetic sensing surface of the second Hall element 4a is generally perpendicular to the magnetic sensing surface of the first Hall element 3a.

Next, the advantage of the second embodiment will be described.

The first and second Hall elements 3a, 4a are arranged adjacent to one another in the single chip 8, so that the number of components is reduced, and the assembling is eased. Furthermore, the accommodating space for accommodating the first and second Hall elements 3a, 4a, can be made smaller. Thus, the installability of the first and second Hall elements 3a, 4a can be further improved.

Third Embodiment

A third embodiment according to the present invention will be described with reference to FIGS. 8A to 9.

In the first and second embodiments, there is described the case where the single magnet 2 is used.

In the third embodiment, as shown in FIG. 8, two substantially identical coaxial magnets (main and auxiliary magnets) 2, which generally have the same radial thickness, the same thickness and the same magnetic force, are provided. The magnets 2 are spaced from one another in the axial direction of the rotatable shaft 1. The first and second Hall elements 3a, 4a are positioned between the two magnets 2 in the axial direction. Here, the settings, such as the diameter of each magnet 2, the gap between each magnet 2 and the first and second Hall elements 3a, 4a and the installation angle of the first and second Hall elements 3a, 4a relative to the outer peripheral edge α of each magnet 2, are the same as those of the first embodiment.

Next, the advantage of the third embodiment will be described.

With the above-described structure of the third embodiment, the amount of magnetic flux, which is supplied to the first and second Hall elements 3a, 4a, can be increased to improve the sensitivity of the first and second Hall elements 3a, 4a. In this way, as shown in FIG. 9, the wave height of the sine wave measurement output (the line indicated by A3 in FIG. 9) of the first Hall IC 3 and the wave height of the cosine wave measurement output (the line indicated by B3 in FIG. 9) can be increased relative to those of the first embodiment (see the line A1 and the line B1 in FIG. 9).

As discussed above, the outputs of the first and second Hall ICs 3, 4 are increased to improve the accuracy of the measured angle and thereby to limit deterioration of the measurement accuracy caused by external disturbances (e.g., influences of external magnetic force).

Fourth Embodiment

A fourth embodiment of the present invention will be described.

This embodiment is about the assembling method of rotational angle sensing device of the third embodiment. The rotational angle sensing device of the third embodiment is assembled as follows.

(1) First, the two coaxial magnets 2 are installed in reversed relation ship, so that the magnetic flux generating portion (N pole) and the magnetic flux attracting portion (S pole) of one of the two magnets 2 are reversed relative to the magnetic flux generating portion (N pole) and the magnetic flux attracting portion (S pole) of the other one of the two magnets 2 (reverse installation step). In other words, the magnetic flux generating portion (N pole) and the magnetic flux attracting portion (S pole) of the one of the two magnets 2 are axially aligned with the magnetic flux attracting portion (S pole) and the magnetic flux generating portion (N pole), respectively, of the other one of the two coaxial magnets 2.

(2) Next, the first and second Hall elements 3a, 4a (the first and second Hall ICs 3, 4) are installed to a predetermined location where magnetic fluxes of the two magnets 2 are substantially cancelled with each other, so that a remaining magnetic flux in the predetermined location becomes substantially zero (Hall element installing step).

Figure 9:
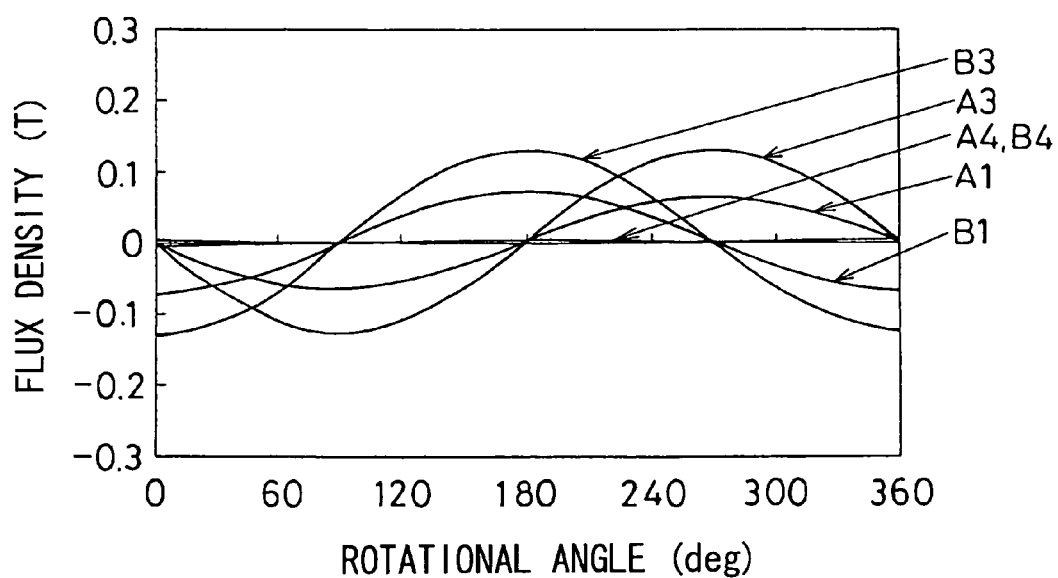
FIG. 9 is a graph showing a relationship between a rotational angle and a magnetic flux density according to the third to fifth embodiments.

The output waveforms of the first and second Hall elements 3a, 4a in this Hall element installing step are indicated by lines A4, B4, respectively, in FIG. 9.

Figure 8A:
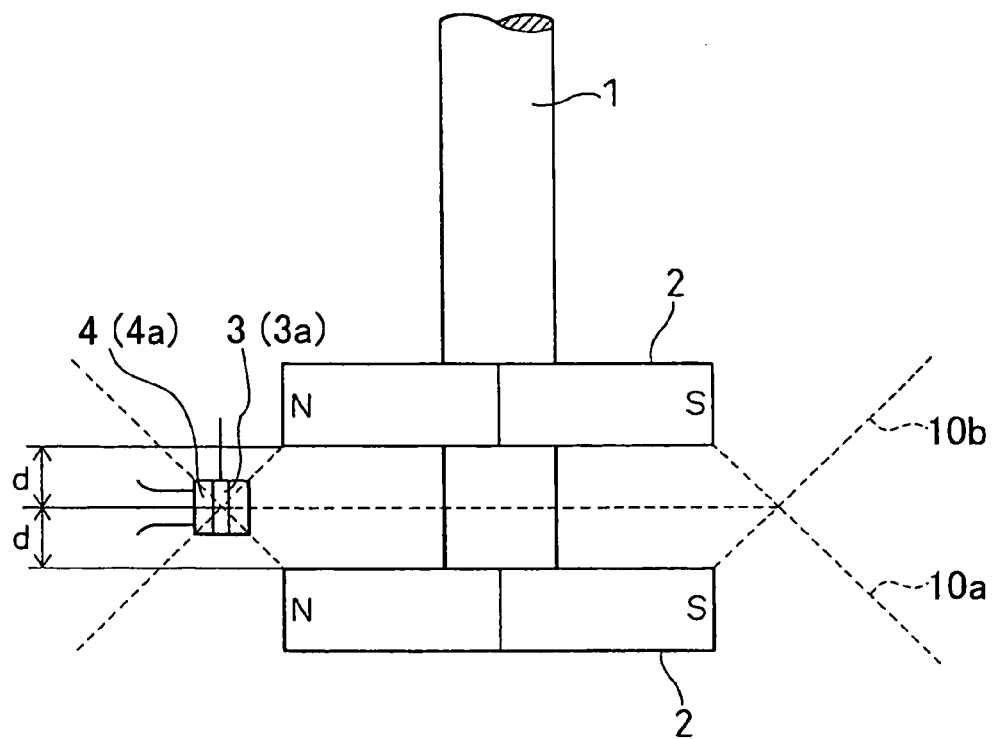
FIG. 8A is a schematic side view of a rotational angle sensing device according to third to fifth embodiments.
Figure 8B:
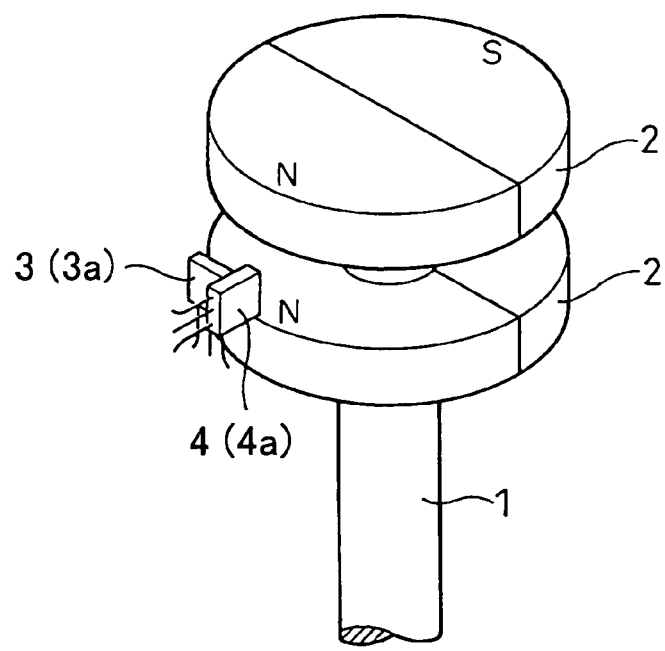
FIG. 8B is a schematic perspective view of the rotational angle sensing device according to the third to fifth embodiments.
Figure 10A:
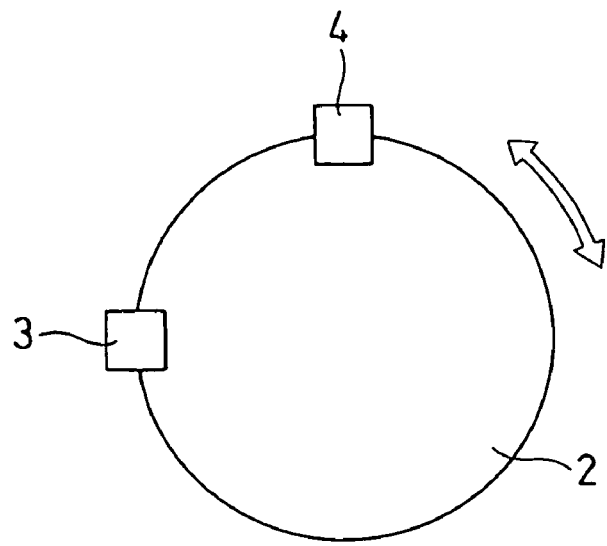
FIG. 10A is a schematic bottom view of a prior art rotational angle sensing device.
Figure 10B:
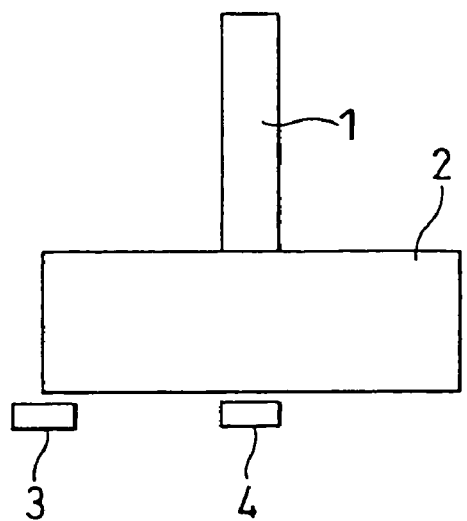
FIG. 10B is a schematic side view of the prior art rotational angle sensing device.

(3) Next, the two magnets 2 are re-installed in such a manner that the magnetic flux generating portion (N pole) and the magnetic flux attracting portion (S pole) of the one of the two magnets 2 are oriented in the same directions as the magnetic flux generation portion (N pole) and the magnetic flux attracting portion (S pole), respectively, of the other one of the two magnets 2 (normal installation step), as shown in FIGS. 8A and 8B. In other words, the magnetic flux generating portion (N pole) and the magnetic flux attracting portion (S pole) of the one of the two magnets 2 are axially aligned with the magnetic flux generation portion (N pole) and the magnetic flux attracting portion (S pole), respectively, of the other one of the two coaxial magnets 2.

Next, the advantage of the fourth embodiment will be described.

When the rotational angle sensing device is assembled in the above described way, the magnetic fluxes of the two magnets are substantially cancelled with each other, and the first and second Hall elements 3a, 4a are installed to the corresponding positions where the magnetic fluxes are substantially cancelled with each other. Therefore, the wave heights of the measurement output waves of the first and second Hall elements 3a, 4a can be made uniform with high precision.

Fifth Embodiment

A fifth embodiment of the present invention will be described.

In the fifth embodiment, a more specific example of the assembling method of the fourth embodiment will be described.

After the Hall element installing step of the fourth embodiment but before the normal installation step), the rotational angle sensing device is temporarily installed to a designated installation position.

Next, the first measurement output (the line A4 in FIG. 9) of the first Hall IC 3 and the second measurement output (the line B4 in FIG. 9) are read as magnetic offset values, which are offset by external disturbance.

Then, after the normal installing step, the angle computing circuit 6, the first measurement output (the line A4) is subtracted (offset) from the measurement output of the first Hall element 3a, and the second measurement output (the line B4) is subtracted (offset) from the measurement output of the second Hall element 4a.

Next, the advantage of the fifth embodiment will be described.

When the rotational angle sensing device is assembled in the above described way, the external disturbance to the magnetic flux at the designated installation position can be cancelled. Thus, it is possible to limit deviations of the wave heights of the measurement outputs of the first and second Hall ICs 3, 4 caused by the external disturbance.

The above embodiments can be modified as follows.

In the above embodiments, the first and second hall ICs 3, 4 are secured stationary, and the magnet(s) is rotated. Alternatively, the magnet(s) 2 may be secured stationary, and the first and second Hall ICs 3, 4 may be rotated. Further alternatively, the magnet(s) 2 and the first and second Hall ICs 3, 4 may be rotated relative to each other.

In the above embodiments, the first and second Hall elements 3a, 4a are used as the examples of the first and second magnetic sensing elements. Alternatively, other types of magnetic sensing elements, such as magneto-resistive elements (MRE), may be used. Also, in some cases, it is not required to provide each of the first and second Hall elements 3a, 4a as a part of the corresponding Hall IC 3, 4. That is, in place of the Hall ICs 3, 4 indicated in, for example, FIGS. 1A and 1B, the Hall elements 3a, 4a alone without the corresponding amplifier 3b, 4b may be arranged in a manner similar to that of the Hall ICs 3, 4 discussed with reference to, for example FIGS. 1A and 1B. In such a case, the corresponding amplifier 3b, 4b may be provided in the circuit board discussed in the first embodiment.

In the above embodiments, the permanent magnet(s) is used to form the magnet(s) 2. Alternatively, electromagnet(s), which generates the magnetic force upon supply of electric current, may be used to form the magnet(s) 2.

In the above embodiments, the degree of opening of the throttle valve is measured through the rotational angle sensing device. Alternatively, the rotational angle sensing device of the present invention may be used to measure other rotational angles, such as a rotational angle of an arm of an industrial robot.

Additional advantages and modifications will readily occur to those skilled in the art. The invention in its broader terms is therefore not limited to the specific details, representative apparatus, and illustrative examples shown and described.

What is claimed is:

1. A rotational angle sensing device for measuring a relative rotational angle between two members, which make relative rotation therebetween, the rotational angle sensing device comprising:
    a magnet that is provided to one of the two members and is configured into one of a ring shape and a circular disk shape, wherein a center of an outer peripheral edge circle, which is defined by an outer peripheral edge of the magnet, substantially coincides with a rotational axis of the relative rotation, and the magnet includes a magnetic flux generating portion and a magnetic flux attracting portion, which are diametrically opposed to each other; and
    first and second magnetic sensing elements that are arranged adjacent to each other and are provided to the other one of the two members, wherein a magnetic sensing surface of the first magnetic sensing element is generally perpendicular to a magnetic sensing surface of the second magnetic sensing element, and the relative rotational angle between the two members is determined through the first and second magnetic sensing elements based on a magnetic flux, which is generated by the magnetic flux generating portion and passes through the first and second magnetic sensing elements toward the magnetic flux attracting portion.

2. The rotational angle sensing device according to claim 1, wherein the first and second magnetic sensing elements are placed to cross an imaginary conical surface that extends out of the magnet from the outer peripheral edge of one axial end surface of the magnet at 45 degrees with respect to an imaginary cylindrical surface, which axially extends through the outer peripheral edge of the one axial end surface of the magnet and is coaxial with the rotational axis.

3. The rotational angle sensing device according to claim 2, wherein:
    an outer diameter of the magnet is in a range of 50 mm to 90 mm; and
    the first and second magnetic sensing elements are placed radially outward of the magnet at a position, which is in a range of 1.5 mm to 3.5 mm from the origin in the radial direction of the magnet.

4. The rotational angle sensing device according to claim 1, wherein:
    the magnet is a first magnet;
    the rotational angle sensing device further comprises a second magnet, which is of the same type as the first magnet and is coaxially arranged with respect to the first magnet in such a manner that the second magnet is axially spaced from the first magnet, and the magnetic flux generating portion and the magnetic flux attracting portion of the second magnet are axially aligned with the magnetic flux generating portion and the magnetic flux attracting portion of the first magnet; and the first and second magnetic sensing elements are positioned between the first magnet and the second magnet in the axial direction of the first and second magnets.

5. The rotational angle sensing device according to claim 1, wherein the first and second magnetic sensing elements are provided in a single chip.

6. The rotational angle sensing device according to claim 1, wherein:
   the magnet is magnetized in such a manner that a magnetic flux generated from the magnet extends in a radial direction of the magnet; and
   a magnetizing direction of the magnetic flux generation portion and a magnetizing direction of the magnetic flux attracting portion are displaced from one another by 180 degrees.

7. The rotational angle sensing device according to claim 1, wherein:
   one of the magnetic sensing surface of the first magnetic sensing element and the magnetic sensing surface of the second magnetic sensing element is parallel to an imaginary tangent plane, which is tangent to the outer peripheral edge of the magnet and is parallel to the rotational axis; and
   the other one of the magnetic sensing surface of the first magnetic sensing element and the magnetic sensing surface of the second magnetic sensing element is generally perpendicular to the imaginary tangent plane.

8. A method for assembling a rotational angle sensing device, the method comprising:
   installing two coaxial magnets, each of which is configured into one of a ring shape and a circular disk shape and has a magnetic flux generating portion and a magnetic flux attracting portion that are diametrically opposed to each other, wherein the magnetic flux generating portion and the magnetic flux attracting portion of one of the two magnets are axially aligned with the magnetic flux attracting portion and the magnetic flux generating portion, respectively, of the other one of the two coaxial magnets;
   installing first and second magnetic sensing elements to a predetermined location where magnetic fluxes of the two magnets are substantially cancelled with each other, so that a remaining magnetic flux in the predetermined location becomes substantially zero, wherein the first and second magnetic sensing elements are arranged adjacent to each other and have magnetic sensing surfaces, respectively, which are generally perpendicular to each other; and
   re-installing the one of the two coaxial magnets in such a manner that the magnetic flux generating portion and the magnetic flux attracting portion of the one of the two coaxial magnets are axially aligned with the magnetic flux generation portion and the magnetic flux attracting portion, respectively, of the other one of the two coaxial magnets.

9. The method according to claim 8, further comprising:
   installing the temporarily assembled rotational angle sensing device in a designated installation position after the installing of the first and second magnetic sensing elements and before the reinstalling of the one of the two coaxial magnets;
   reading first and second measurement outputs, which are generated by the first and second magnetic sensing elements, respectively, as magnetic offset values;
   subtracting the first measurement output from a measurement output of the first magnetic sensing element after the reinstalling of the one of the two coaxial magnets; and
   subtracting the second measurement output from a measurement output of the second magnetic sensing element after the reinstalling of the one of the two coaxial magnets.

10. A rotational angle sensing device for measuring a relative rotational angle between two members, which make relative rotation therebetween, the rotational angle sensing device comprising:
    a magnet that is provided to one of the two members and is configured into one of a ring shape and a circular disk shape, wherein a center of an outer peripheral edge circle, which is defined by an outer peripheral edge of the magnet, substantially coincides with a rotational axis of the relative rotation, and the magnet includes a magnetic flux generating portion and a magnetic flux attracting portion, which are diametrically opposed to each other; and
    first and second magnetic sensing elements that are arranged with respect to each other so that only one accommodating space is required for accommodating the first and second magnetic sensing elements and are provided to the other one of the two members, wherein a magnetic sensing surface of the first magnetic sensing element is generally perpendicular to a magnetic sensing surface of the second magnetic sensing element, and the relative rotational angle between the two members is determined through the first and second magnetic sensing elements based on a magnetic flux, which is generated by the magnetic flux generating portion and passes through the first and second magnetic ensing elements toward the magnetic flux attracting portion.

* * * * *